J. T. RICE.
CENTERING APPARATUS.
APPLICATION FILED DEC. 11, 1908.
959,167.
Patented May 24, 1910.
4 SHEETS—SHEET 2.
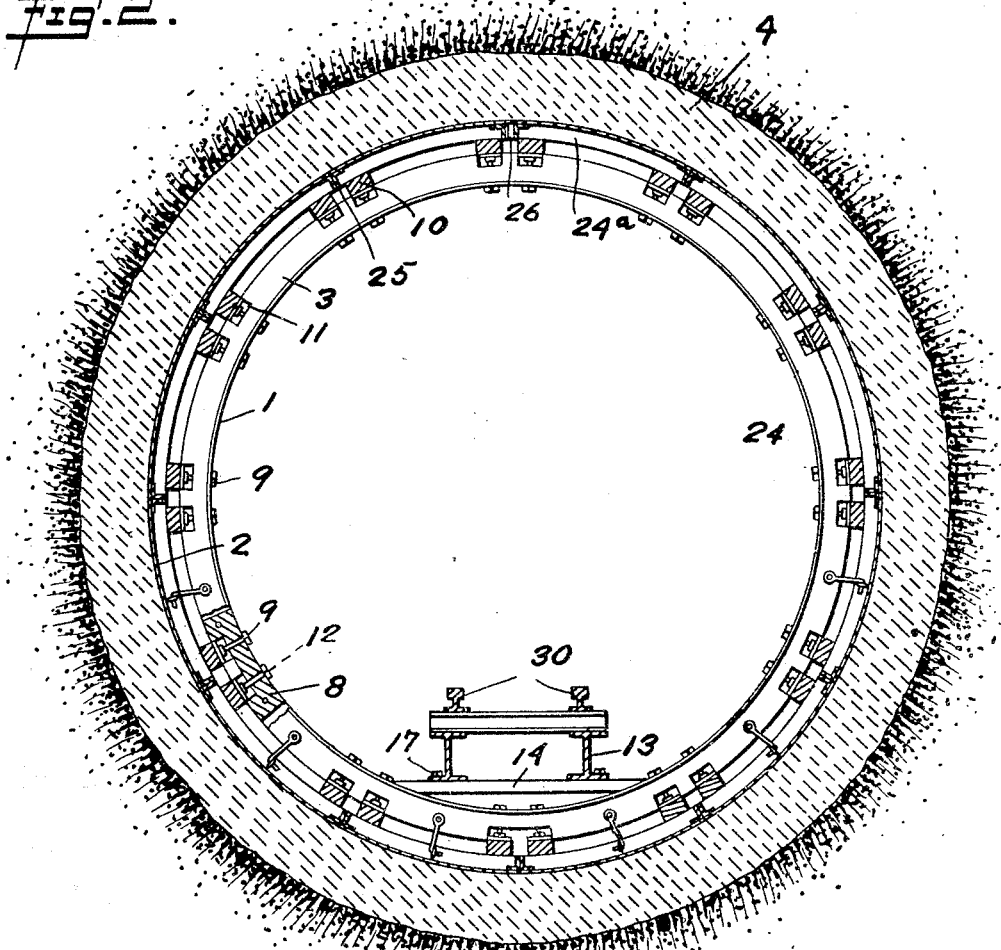
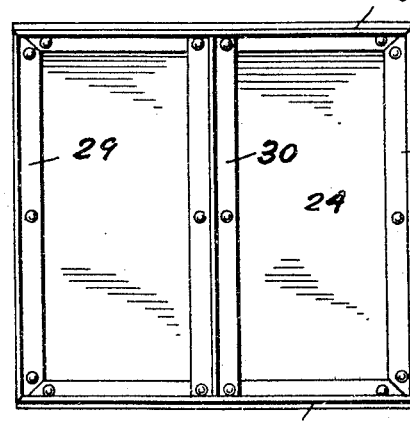
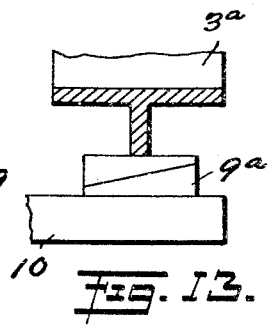
WITNESSES
INVENTOR
Joseph T. Rice
BY
ATTORNEY

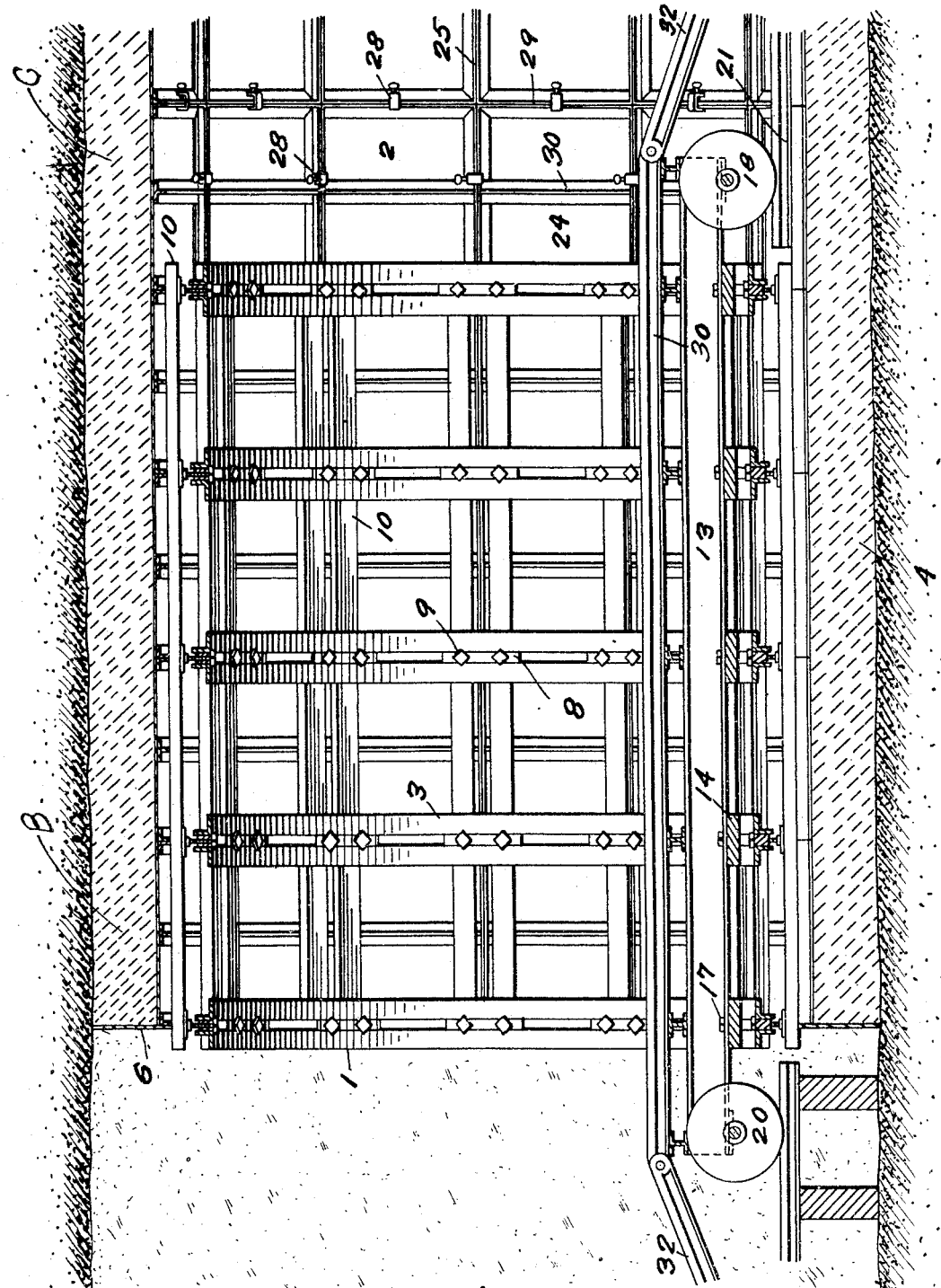

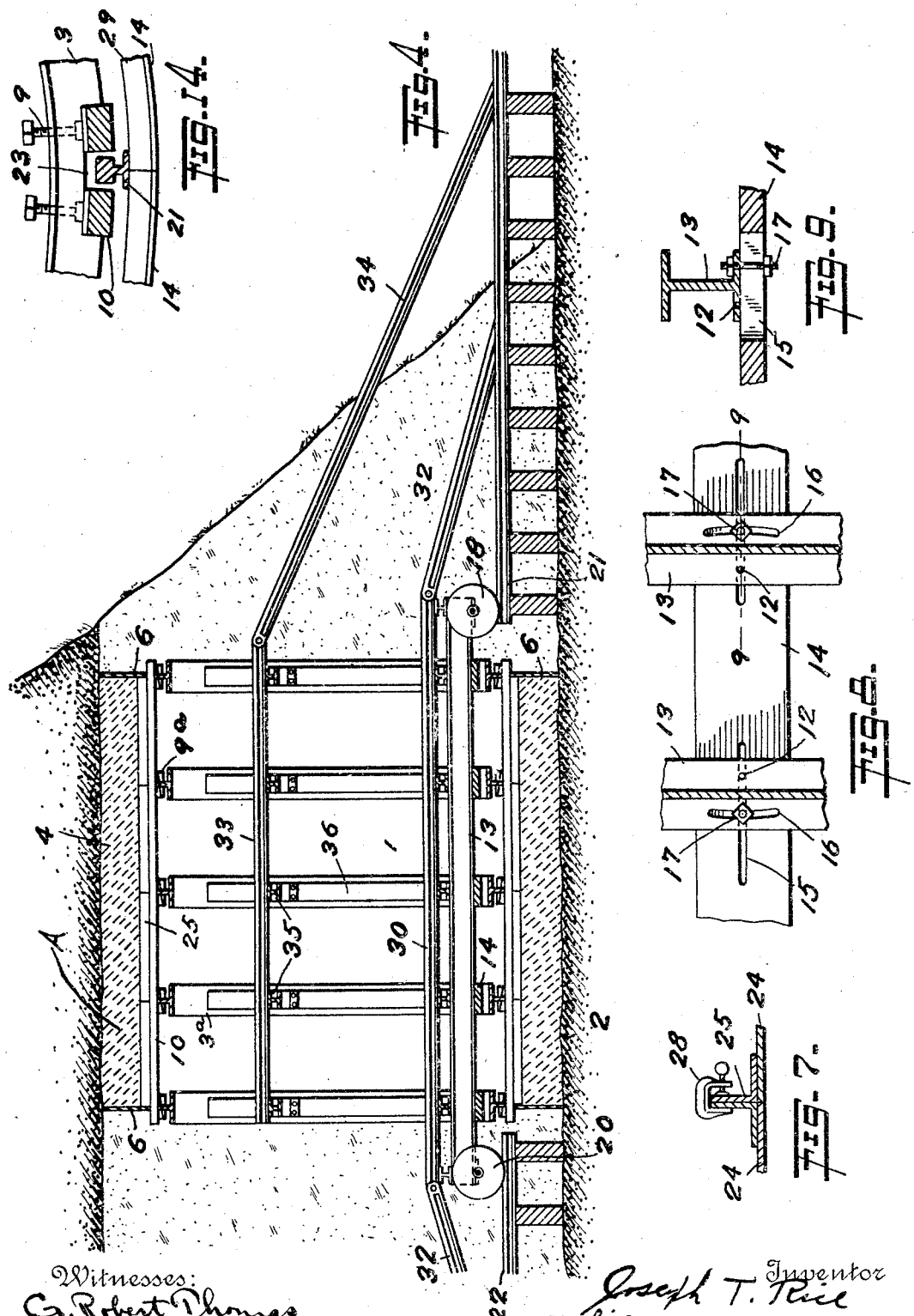

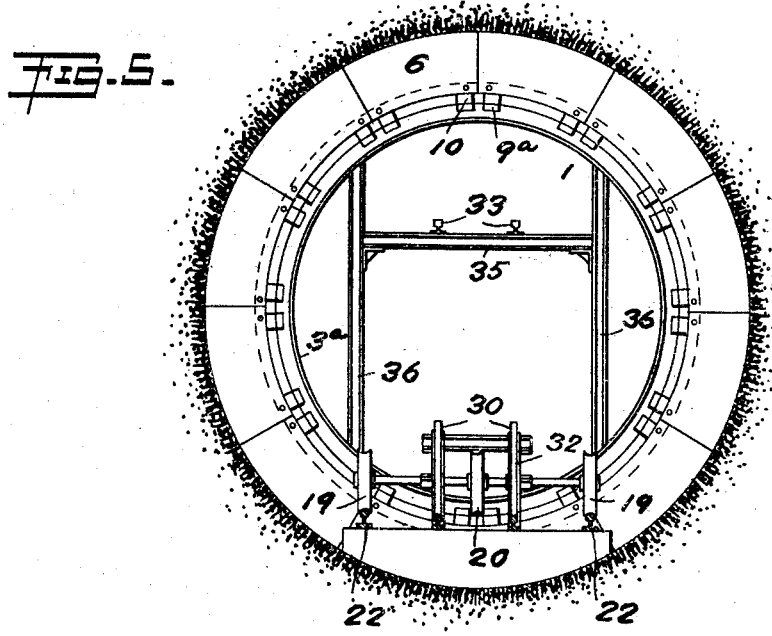
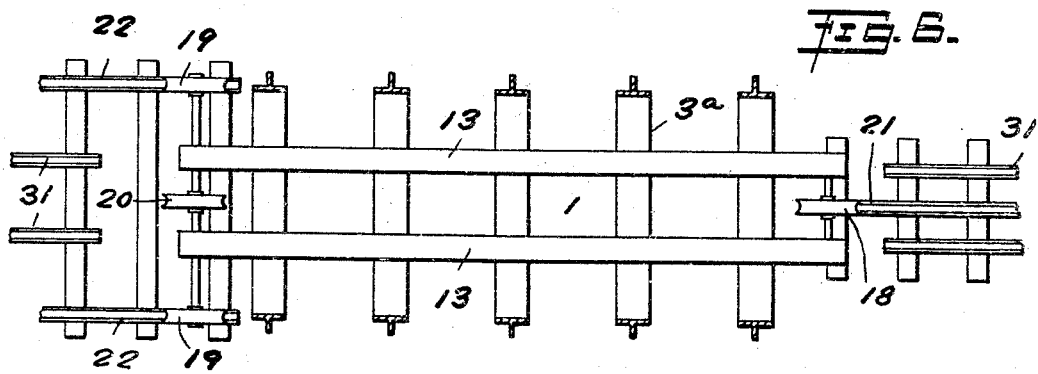
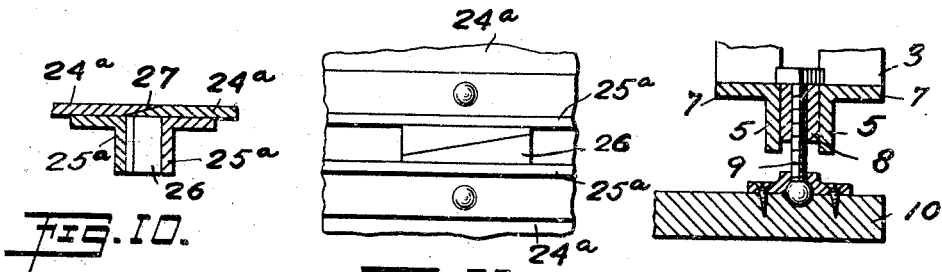

UNITED STATES PATENT OFFICE.

JOSEPH T. RICE, OF NEW YORK, N. Y.

CENTERING APPARATUS.

959,167.  Specification of Letters Patent.  Patented May 24, 1910.

Application filed December 11, 1908. Serial No. 467,030.

*To all whom it may concern:*

Be it known that I, JOSEPH T. RICE, a citizen of the United States of America, and a resident of the borough of Bronx, in the city, county, and State of New York, have invented certain new and useful Improvements in Centering Apparatus, of which the following is a specification.

This invention relates to an apparatus for the construction of monolithic cement or concrete linings for tunnels, such as aqueduct tunnels, sewer tunnels, etc.

Heretofore, in the construction of tunnel linings, it has been customary to mold first the "invert" or lower portion of the lining, and, after the invert has set, to mold the arch, or upper part of the lining. This mode of operation results in a distinct joint between the arch and invert; and the great desideratum in such linings is the avoidance of joints. The various forms of molds or centers generally used for the construction of such linings have consisted of collapsible or knockdown framework and lagging or other form of sheathing laid thereon to sustain the concrete shoveled behind. In these forms of apparatus the supporting framework and the sheathing are practically one structure; they stand together, and they must be collapsed and moved together. And usually they must be transported in disassembled condition. Hence, the whole apparatus must be left standing until the cement has hardened, or else the hardening cement must be too soon deprived of its mold support. I am aware that there have been various attempts and propositions looking toward the bettering of one or other of these conditions; but there has not been brought forward hitherto a method or apparatus that has satisfied all the requirements.

The aim of my invention is to enable the construction of a tubular section of lining without joint and of considerable length, in one operation, so to speak.

The apparatus of my invention comprises a number of coöperating, but to some extent, independent phases. Not every set of conditions will make it necessary or desirable to utilize all the phases of the apparatus of the invention in combination; and, also, parts of the invention may be used independently or in association with other general assemblages.

The apparatus comprises a transportable center, sectional tubular sheathing adapted to be built up on the center and to be self-supporting when backed by the lining and deprived of the support of the center, the center and sheathing being adapted to be disengaged from each other and to permit the center to be transported through the self-supporting sheathing as a unit. In describing the sheathing as "sectional," I wish to be understood as designating a construction in which the joints extend longitudinally, so that the sheathing may be built up from the bottom to the top of the arch, and in which the sections are separate. By "tubular," I do not, of course, limit myself to hollow cylindrical, or circular in cross-section. I wish to point out particularly what I mean by "self-supporting" sheathing. By this term I describe one which will not merely stand precariously or unreliably, but one that will stand firmly and solidly as a unit, after the removal of the center; being adequate not only for its own support but also to afford the hardening cement full and adequate molding support until hard.

Preferably, the center is transportable by reason of rolling supports, mounted on the center, as wheels, or otherwise disposed. Preferably the center is constructed, so as to permit unobstructed passage therethrough. In the preferred embodiment of the apparatus, also, the center comprises ribs conforming to the cross-sectional contour of the lining to be constructed, and members uniting the ribs into one structure. But the transportable center need not in all instances be so constructed; and the invention relates broadly to a transportable center having supports in advance and in rear of the tubular section of lining to be constructed, so that the center spans the region where the bottom, or "invert", of the section of lining is to be constructed. While transportable centers have been proposed heretofore it has been impossible to construct monolithic tubular sections of tunnel lining of any desirable length, because the center stood upon the bottom of the tunnel within the limits of the section to be constructed. Hence, it was necessary to lay the bottom of the section of lining and allow it to harden, before the upper part, or "arch", of the section could be constructed. In this phase, the invention consists in centering apparatus comprising, as set up, a transportable center having supports at front and rear, and a tubular length of sectional sheathing supported by said center between the supports thereof, the transportable center being adapted to be disengaged from the sheathing and to be transported ahead into the excavation leaving the sheathing standing.

Another phase of the invention relates to spacing devices adapted to connect the center and the self-supporting sheathing, which, when released, allow for clearance between the sheathing and the center, so that the latter may be transported through the self-supporting sheathing without being collapsed. This and the following phases of the invention, I may note, are not limited to completely tubular sheathing and lining, as the invention in these phases is applicable to work, for example, involving a lining consisting of side walls and an arch.

A further phase of my invention involves a self-supporting sectional sheathing for supporting tunnel linings and the like, consisting of metal plates provided with abutting flanges, and an expanding device adapted to lock the sheathing in place. Preferably, such expanding device operates between spaced flanges on the pair of top arch plates. Preferably, too, these arch plates have a beveled overlapping junction. Also, I may utilize novel means for uniting the abutting flanges of said plates, in the nature of clamps, using this term in the generally accepted sense to designate uniting devices distinguished from bolts. But it is obvious that I am not limited to such means for enabling the sheathing to stand after the transportable center has been moved away.

Another phase of the invention relates to a transportable skeleton center, having ribs conforming to the cross-sectional contour of the lining, and members uniting said ribs into one structure, and means whereby the ribs may be relatively adjusted to conform to curves in the line of the tunnel. In the preferred construction embodying this phase of the invention, the ribs are united by longitudinal members extending the length of the center, and the ribs are secured to these members by slotted connections adapted to permit the relative adjustment of the ribs. But I do not limit myself to this particular mode of securing the adjustment, and regard it as broadly new in a transportable center to provide means for adjusting the ribs for curves.

Another phase of the invention relates to a transportable skeleton center, having ribs conforming to the cross-sectional contour of the lining to be constructed, and members uniting said ribs into one structure, together with upper and lower tracks for cars carried within said center. In a development of this phase of the invention, the upper track is adapted to be connected as a continuation of a track in the work, of which the lower track is also a continuation, by means of a pivoted track section, which may be raised up out of the way of cars passing to or from the lower track.

Another phase of the invention comprises a self-supporting sectional sheathing for supporting tunnel linings and the like, consisting of metal plates provided with abutting flanges, means for holding said plates together, and segmental bulkhead plates secured to the end plates of the sheathing.

The invention also comprises the various novel features of construction constituting the preferred embodiments of the above-described phases, as will be pointed out in the more specific claims appended hereinafter.

The accompanying drawings show desirable embodiments of the invention; but it must be understood that my invention may assume other forms than those shown for purpose of illustration.

In these drawings, Figure 1 is a vertical longitudinal section through a transportable skeleton center and sectional self-supporting sheathing, indicating also the tunnel and a portion of completed lining; Fig. 2 is a cross-section corresponding to Fig. 1; Fig. 3 is a detail view of a form of plate for the sectional lining; Fig. 4 is a vertical longitudinal section similar to Fig. 1, showing more particularly the upper and lower tracks and omitting other confusing details; Fig. 5 is an end view, taken at the left of Fig. 4, and illustrating incidentally the segmental bulkhead plates; Fig. 6 is a sectional plan corresponding to Figs. 4 and 5, being taken immediately above the longitudinal I-beams shown as uniting the ribs; Fig. 7 is a detail of the clamp union between two of the plates of the sectional self-supporting sheathing; Fig. 8 is a detail of the adjustable mounting of the ribs; Fig. 9 is a section on the line 9—9 of Fig. 8; Fig. 10 is a detail section of an expanding key for the sheathing plates; Fig. 11 is a detail bottom plan corresponding to Fig. 10; Fig. 12 is a detail section on the line 12 of Fig. 2; Fig. 13 is a detail of a form of spacing device, shown also in Fig. 4; and Fig. 14 is a detail of the bottom of one of the ribs and the lowermost plates of the sheathing, showing how a rail may be inserted between.

Referring to these views, the numeral 1 designates an embodiment of the transportable skeleton center, and 2 an embodiment of the self-supporting sectional sheathing. I shall now devote myself to a concise description of these and the other illustrated embodiments of the features and phases of my invention; but it should be borne in mind that this portion of the specification, together with the drawings to which it refers, is primarily illustrative, and that the essence of the invention will be found in the foregoing brief and general analysis of the invention and in the appended claims which complement such analysis.

The skeleton center 1 comprises a plurality (that is, more than one) of ribs 3 or 3ª, which conform to the cross-sectional contour of the lining to be constructed. They are shown circular, for a cylindrical lining 4, but it will be obvious that the invention is in no way limited to circular ribs.

The ribs 3 shown in Figs. 1, 2, 12 and 14 are formed each of a pair of angle-iron hoops, arranged with one pair of flanges 5 parallel to each other and the other pair 7 extending oppositely in alinement. Between flanges 5 are spacing blocks 8, through which and through said flanges may pass uniting bolts or like devices. These blocks 8 are internally threaded for the passage of spacing devices 9, in the nature of jack screws, which may be operated by wrench or otherwise.

The ribs 3ª, shown in Figs. 4, 5, 6 and 13, are each formed of T-iron, having the web outward and the flanges inward. The spacing devices 9ª shown in connection with this form of rib in Figs. 4 and 13 is in the nature of a wedge or pair of wedges. Of course, the ribs may or may not be of one piece circularly. Between the spacing devices 9 and 9ª and the sheathing 2, I prefer to interpose pieces of lagging or longitudinal bars 10, extending the length of the center 1. When the spacing devices are released, by withdrawing the jack screws 9 or knocking out the wedges 9ª, the lagging 10 may rest in notches or recesses 11 in the flanges 5 of the ribs 3 or the webs of the ribs 3ª. Below the horizontal diameter of the ribs, it is desirable to provide means for holding the lagging 10 in these notches when the spacing devices are released. One embodiment of such means is that illustrated in Fig. 12, where the ends of the jack screws 9 are shown as swiveled in face plates secured to the inner surface of the lagging. The ribs 3 or 3ª are united into a single structure by means, preferably, of a pair of longitudinal members, such as I-beams 13, extending the length of the center 1. The I-beams 13 may rest upon and be secured to bed plates or members 14 bolted to the ribs 3 or 3ª and subtending the lower arcs thereof. To enable the center to negotiate curves, the bed plates 14 may be provided with slots 15, disposed transversely of the axis of the center, and the bottom flanges of the two I-beams 13 may have formed therein concentrically arcuate slots 16 arranged transversely with reference to the slots 15. Bolts 17, passing through the slots 15 and 16, unite the I-beams with the plates 14 and permit the ribs both to be shifted transversely and to be turned about a vertical axis, so as to allow of the proper relative adjustment of the ribs for a curve in the work. Bolt holes 12 may also be formed in the bottom flanges of the I-beams 13, in registry with the slots 15; and bolts passed through these holes and slots will serve to lock the ribs against turning.

The center 1 is preferably supported on wheels mounted on axles carried by portions of the I-beams 13 that project beyond the end ribs 3 or 3ª. Being thus carried outside the end ribs, the wheels do not interfere with the construction of the section of lining being molded. Preferably, there is a single central wheel 18 at the rear of the center 1, and three wheels 19, 19 and 20 at the forward end of the center. The rear wheel 18 runs upon a rail 21, and the outside forward wheels 19 run upon two rails 22. The central forward wheel 20 is inoperative in the forward travel of the center, but runs upon the rail 21 when the center is moved backward. Preparatory to such backward movement, the outside forward wheels 19 may be removed, if necessary, to clear the completed section of lining and the sheathing 2 thereon. Before moving the center backward or forward, it may be jacked up, so that the rail 21 may be slid forward over the sheathing. If necessary the ribs may be cut away at their bottoms, as at 23, so as to permit the rail 21 to be positioned between the sheathing and the ribs.

The sheathing 2 comprises a plurality of plates 24, provided internally, at their longitudinal margins, with flanges 25, conveniently afforded by angle irons bolted to the plates. The several flanges 25 abut against each other, thus contributing in large measure to the self-supporting character of the sheathing. The top pairs of arch plates 24ª have flanges 25ª set back from the longitudinal margins, so as to permit the insertion of an expanding device, which may or may not be in the nature of a pair of wedges 26, and which serves to lock the complete circuit of plates together. See Figs. 10 and 11. Preferably, these arch plates have an overlapping, beveled junction 27, as indicated in Fig. 10, a feature whose coöperation with the expanding device 26 is plain. Further to unite the plates 24, I may utilize clamps 28 of any suitable type. The advantage of clamps over bolts is that, for such purposes, owing to the pressure of the lining on the sheathing, it is difficult to remove bolts without destroying their thread.

The plates 24 might extend the full length of the center, and still constitute a sectional sheathing in the sense in which I use the term "sectional" as referring to the sheathing, but this construction would render the plates undesirably heavy; so I prefer to construct them of a length equal to the distance between the centers of the ribs 3 and 3ª. At their transverse, or end, margins, the plates may have flanges 29, similar to flanges 25;

these flanges on adjacent plates abutting against each other and being desirably connected by other clamps 28. In addition to the reinforcement afforded the plates by the flanges or angle irons 25 and 29, I may provide another reinforcing element in the nature of a T-iron 30 extending transversely of the area of the plate.

To the flanges 29 of the end plates of the sheathing 2 I secure the segmental bulkhead plates 6. Segmental bulkhead plates are not new; but the mounting thereof on the self-supporting sheathing is one of the features of my invention. With this arrangement, they may be left undisturbed when the center 1 is disengaged from the sheathing 2 and pushed on into the excavation.

Upon the I-beams 13 may be laid a single or double track 30, for cars to travel over. This track may be connected with tracks 31 in the work before and behind, by means of inclined, preferably pivoted, track sections 32. Or the tracks 31 may be supported on a level with the track 30, so as to dispense with the sections 32. Thus, cement cars may be run into the center 1, and excavation cars may be run entirely therethrough.

It is desirable to provide the transportable center 1 with an upper track, upon which cement cars may be run, as the construction of the section of lining approaches the top of the arch. Such track is indicated at 33, and may be connected with the track 31 in the completed work behind by means of a pivoted track section 34, which may be raised up out of the way of cars moving to or from the track 30. The track 33 may be carried upon a platform or cross-pieces 35 supported by vertical braces 36 secured to the ribs 3 or 3ᵃ (see Figs. 4 and 5).

Operation: Fig. 4 shows the transportable center 1 at the mouth of the tunnel, ready to be advanced into the excavation, the first jointless tubular section of lining A being in position. Fig. 1 shows the center 1 farther in the tunnel, ready to be pushed ahead into the excavation. The just-completed section of lining B is supported by the sheathing 2, which has not yet been disengaged from the center 1. A portion of the last completed section of lining C is shown at the right of the view, hardening in contact with the self-supporting sheathing. The clamps 28 are shown at the right of this view, but omitted at the left for sake of clearness. At the beginning of the construction of any section of the lining, the skeleton center 1 is supported by the wheels 18 and 19, or upon any suitable blocks or jacks placed under the I-beams 13, spanning the region to be occupied by the section of lining to be constructed. The lower plates 24 of the sheathing are now put in position, being held, if desired, by hooks or other fastening devices 37 secured to the ribs 3 or 3ᵃ. The cement or concrete is admitted behind these plates through the spaces between the ribs, and tamped, if necessary. The operation of building up the sectional sheathing upon the ribs and the placing of the cementitious material behind the plates of the sheathing continues to the top of the arch. The fastening of the segmental bulkhead plates 6 to the end plates of the sheathing progresses upward with the building up of the sheathing. As the operation approaches the top of the arch, the material may be taken from cars on the upper platform 35. It will be seen that, at all times, there is no obstacle to the admission of the cementitious matter behind the self-supporting sheathing, except when it comes to the formation of the key of the lining section, after the top plates have been placed on the ribs. This, of course, must be done from the end of the plates, and the material rammed home. Otherwise, the operation is remarkably rapid; and the ease of operation is largely contributed to by the construction of the center interiorly so as to permit free passage therethrough. After the topmost plates 24 are in position, the whole circuit of plates, or the several circuits, are keyed in position by the expanding device 26. Further to unite the plates, the clamps 28 may be used. The skeleton center 1 is now disengaged from the self-supporting sheathing 2 by releasing the spacing devices 9 or 9ᵃ, and the center is advanced into the excavation on its wheels; the rail 21 having first been slid forward on the bottom of the sheathing 2, as already described. The next section of the lining is now constructed in the same manner; the bulkhead plates 6 at the forward end of the completed section of lining being removed in proportion as the construction of the new section proceeds upward. Of course, as the skeleton center is advanced into the work, the rails and tracks ahead are taken up progressively, and the rails and tracks behind are slid forward, as in the case of the rails 21, or simply extended, as in the case of track 31. A section of lining will be about the measure of a day's work, since the next section cannot be begun until the prior section has hardened sufficiently to warrant the progressive removal of the forward bulkhead plates, and some time is required for this degree of hardening. Therefore, it is well that the length of the center 1 correspond to the length of section that can actually be built in a day. By means of my construction, it is possible to build a section of lining of considerable length; the structure of the center and the manner of supporting it permitting the distance between end ribs to be twenty-five feet or greater. However, of course, dimensions will vary entirely with different conditions. What I desire to emphasize is that I have produced a transportable skeleton center, by the use of which as long a section of tunnel lining can be completed at a time as the conditions render desirable.

One of the great advantages of my construction is its facilitation of the engineers' operations. It will be seen that the grade and line are permanently established when the forward rails 19 are properly set.

While I have described my apparatus as adapted more particularly for the construction of cement or concrete tunnel linings without joint between the arch and invert, it will be obvious that it may be used for the construction of sewers and the like by the open trench method; also, that the apparatus may be used for the construction of arches or inverts, instead of complete linings or pipes; also that the apparatus may be used in the construction of linings and arches of material other than concrete, for example, masonry.

When operating upon curves, lengths of wooden lagging or other semi-flexible material will be used instead of the rigid plates 24 for the sectional sheathing.

I may call attention to two advantages of making the plates 24 of such length that a plurality of transverse series of plates are included in the length of the center. One is that, in constructing the key portion of the arch of the lining, the shoveling of the material from the end and the packing of the material does not have to be done for the full length of the center, but only for the lengths of the several arch plates. Another advantage is that, if it is desirable to mold at one operation a section of lining shorter than the length of the center, the center may be advanced only the distance of one, two, or more ribs, and a corresponding number of transverse series of plates built up thereon.

What I claim as new is:—

1. Centering apparatus for use in constructing linings for tunnels and the like, comprising, as set up, a transportable structure having supporting wheels at front and rear between which said structure spans the bottom of the excavation, a series of ribs carried by said structure between said wheels, and sectional sheathing consisting of separate members built up on said ribs and adapted to be self-supporting, and said transportable structure being adapted to be transported longitudinally of the excavation leaving the sheathing standing.

2. Centering apparatus for use in constructing tubular linings for tunnels and the like in monolithic tubular sections of considerable length, comprising, as set up, a transportable center having front and rear supports at remote regions lengthwise of the excavation, between which supports said center spans the bottom of the excavation, and a tubular length of sectional sheathing carried by and encircling said center between said supports, the said sheathing comprising cross-sectionally a plurality of separate members adapted to be united so as to be self-supporting when backed by the lining to be constructed and deprived of the support of the transportable center, said center being adapted to be disengaged from the sheathing and to be transported into the excavation ahead leaving the sheathing standing.

3. Centering apparatus for use in constructing tubular linings for tunnels and the like in monolithic tubular sections of considerable length, comprising, as set up, a transportable center having front and rear supports at remote regions lengthwise of the excavation, between which supports said center spans the bottom of the excavation, said transportable center being constructed to permit of free passage therethrough, and a tubular length of sectional sheathing carried by and encircling said center between said supports, the said sheathing comprising cross-sectionally a plurality of separate members adapted to be united so as to be self-supporting when backed by the lining to be constructed and deprived of the support of the transportable center, said center being adapted to be disengaged from the sheathing and to be transported into the excavation ahead leaving the sheathing standing.

4. Centering apparatus for use in constructing tubular linings for tunnels and the like in monolithic tubular sections of considerable length, comprising, as set up, a transportable center having front and rear supports at remote regions lengthwise of the excavation, between which supports said center spans the bottom of the excavation, a tubular length of sectional sheathing, comprising cross-sectionally a plurality of members, carried by and encircling said center between said supports, and means uniting the members of said sheathing so as to render the sheathing self-supporting, said center being adapted to be disengaged from said sheathing and to be transported longitudinally of the excavation leaving the sheathing standing.

5. Centering apparatus for use in constructing tubular linings for tunnels and the like in monolithic tubular sections of considerable length, comprising, as set up, a transportable skeleton tubular center having front and rear supports at remote regions lengthwise of the excavation, between which supports said center spans the bottom of the excavation, and a tubular length of sectional sheathing carried by and encircling said center between said supports, the said sheathing comprising cross-sectionally a plurality of separate members adapted to be united so as to be self-supporting when backed by the lining to be constructed and deprived of the support of the transportable center, said center being adapted to be disengaged from the sheathing and to be transported into the excavation ahead leaving the sheathing standing.

6. Centering apparatus for use in constructing tubular linings for tunnels and the like in monolithic tubular sections of considerable length, comprising, as set up, a transportable center comprising ribs conforming to the cross-sectional contour of the lining to be constructed and members uniting said ribs into one structure, said center having front and rear supports at remote regions lengthwise of the excavation between which supports the center spans the bottom of the excavation, and a tubular length of sectional sheathing carried by and encircling said center between said supports, the said sheathing comprising cross-sectionally a plurality of separate members adapted to be united so as to be self-supporting when backed by the lining to be constructed and deprived of the support of the transportable center, said center being adapted to be disengaged from the sheathing and to be transported into the excavation ahead leaving the sheathing standing.

7. Centering apparatus for use in constructing tubular linings for tunnels and the like in monolithic tubular sections of considerable length, comprising, as set up, a transportable skeleton tubular center having front and rear supports at remote regions lengthwise of the excavation, between which supports said center spans the bottom of the excavation, a tubular length of sectional sheathing carried by and encircling said center between said supports, the said sheathing comprising cross-sectionally a plurality of separate members adapted to be united so as to be self-supporting when backed by the lining to be constructed and deprived of the support of the transportable center, and releasable spacing devices between said center and said sheathing, the whole being adapted, upon release of such spacing devices to afford clearance between the center and sheathing, whereby the center may be transported through the self-supporting sheathing into the excavation ahead.

8. Self-supporting sectional sheathing for use in constructing tunnel linings and the like, consisting of separate metal plates provided with abutting flanges on their longitudinal edges, and an expanding device adapted to unite the plates together.

9. Self-supporting sectional sheathing for use in constructing tunnel linings and the like, consisting of separate metal plates provided with abutting flanges on their longitudinal edges, adjacent arch plates having spaced flanges, and an expanding device adapted to operate between the last-named flanges to unite the plates together.

10. Self-supporting sectional sheathing for use in constructing tunnel linings and the like, consisting of separate metal plates provided with abutting flanges on their longitudinal edges, adjacent arch plates having beveled overlapping junction, and an expanding device adapted to operate to force said arch plates apart to unite all the plates together.

11. Centering apparatus, comprising a transportable center, sectional tubular sheathing comprising cross-sectionally a plurality of separate plates adapted to be built up on the center and to be self-supporting when backed by the lining to be constructed and deprived of the support of the center, and segmental bulkhead plates adapted to be removably secured to the end plates of such sheathing, the center and sheathing being adapted to be disengaged from each other and to permit the center to be transported through the self-supporting sheathing as a unit.

12. A transportable skeleton center, having ribs conforming to the cross-sectional contour of the lining to be constructed, and members uniting said ribs into one structure, and supporting wheels carried by said center and disposed outside the end ribs between which wheels the skeleton center spans the bottom of the excavation.

13. A transportable skeleton center, having ribs conforming to the cross-sectional contour of the lining to be constructed, and members uniting said ribs into one structure, and slotted connection between said ribs and members whereby the ribs may be relatively adjusted to conform to curves in the line of work.

14. A transportable skeleton center, having ribs conforming to the cross-sectional contour of the lining to be constructed, bed members secured within said ribs toward the bottoms thereof, longitudinal members resting upon said bed members and extending the length of the center, and slotted connection between said bed members and longitudinal members, whereby the ribs may be adjusted relatively to conform to curves in the work.

15. Centering apparatus, comprising a transportable skeleton center comprising ribs conforming to the cross-sectional contour of the lining to be constructed, and members uniting said ribs into one structure, sectional sheathing adapted to be built up on said ribs and to be self-supporting when backed by the lining and deprived of the support of the skeleton center, releasable spacing devices adapted to connect the ribs and sheathing, and longitudinal bars adapted to be interposed between said devices and the sheathing, together with means for holding certain of said bars to the ribs when said devices are released.

16. Centering apparatus, comprising a transportable skeleton center comprising ribs conforming to the cross-sectional contour of the lining to be constructed, members uniting said ribs into one structure, and supports at front and rear between which the center spans the bottom of the excavation together with sectional sheathing adapted to be built up on said ribs and to be self-supporting when backed by the lining and deprived of the support of the skeleton center, said sheathing being formed of plates of such length that a plurality of transverse series of plates are included in the length of the center, the skeleton center and sheathing being adapted to be disengaged from each other and to permit the center to be transported through the self supporting sheathing as a unit.

Signed at New York, N. Y. this 9th day of December 1908.

JOSEPH T. RICE.

Witnesses:
J. F. Brandenburg,
G. R. Thomas.